United States Patent Office 3,491,051
Patented Jan. 20, 1970

3,491,051
FABRIC TREATING COMPOSITIONS
Harold L. Elkin, Levittown, Pa., and William D. Hassall, Trenton, N.J., assignors to Thiokol Chemical Corporation, Bristol, Pa., a corporation of Delaware
No Drawing. Continuation-in-part of application Ser. No. 381,882, July 10, 1964. This application June 3, 1966, Ser. No. 554,987
Int. Cl. C08g 51/24, 41/04
U.S. Cl. 260—29.6
16 Claims

ABSTRACT OF THE DISCLOSURE

The invention discloses use of substantially water soluble salts of polyacrylic acid as emulsifying agents to provide novel urethane aqueous emulsion systems of high dilution or low solids content which have vastly enhanced stability and which are stable as emulsions over prolonged intervals of time, e.g., 60 or more days, at ambient temperatures prior to their use. The improved urethane emulsion systems are used in imparting crease and abrasion resistance properties to fabrics. The systems avoid the necessity for enrichment of their solids contents during continuous application of the emulsions fabrics.

---

The present application is a continuation-in-part application of S.N. 381,882, filed July 10, 1964, now abandoned.

The present invention relates to improved fabric treating compositions for use on fabrics, especially of the tion relates to novel and improved aqueous emulsion systems, the improvement comprising the use of substantially water soluble salts of polyacrylic acid therein to impart vastly enhanced stability to the emulsions.

It is an object of the present invention to provide novel urethane aqueous emulsion systems of high dilution or very low solids content which are stable as emulsions over prolonged intervals of time at ambient temperatures prior to their use.

It is another object of this invention to provide improved urethane emulsion systems for use in imparting crease and abrasion resistant properties to fabrics wherein such systems avoid the necessity of enrichment of their solids content during continuous application to fabrics.

Other objects of this invention are inherent in or are obvious from the following explanations and examples.

The textile industry has long sought textile finishing compositions which may be readily used in existing textile finishing equipment for imparting improved wear, crease, and abrasion resistant properties to various fabrics. The industry has particularly sought textile finishing compositions for use on fabrics, especially of the wash and wear type, which are more apt to be subject in the course of normal usage to rough and/or repeated wear and laundering than other types of fabrics. Borsellino and Samson in their U.S. patent application 170,251, filed on Jan. 31, 1962, now U.S. 3,248,259, have disclosed urethane emulsion compositions which are particularly suited to providing such wear, crease, and abrasion resistant properties to fabrics such as have been sought. The present invention, however, represents a substantial improvement over the compositions disclosed by Borsellino and Samson in that the present emulsions may be diluted with water up to 99.5% or more and still be stable, whereas the Borsellino and Samson emulsions are of sharply limited stability with respect to time even at higher solids content. Further, use of the Borsellino and Samson compositions in the continuous impregnation and/or coating of fabrics prior to cure treatment necessitates enrichment of the emulsion systems with urethane prepolymers and curing agents from time to time in order to maintain a constant percent solids content in such emulsions. The present emulsions, however, do not require such enrichment during the continuous impregnation and/or coating of fabrics due, it is believed, to their superior emulsion stability.

It has been unexpectedly found, according to the present invention, that if aqueous urethane prepolymer and curing agent emulsions are prepared using about 0.01 to 10 parts by weight of at least one water soluble salt of polyacrylic acid, such as the sodium, the potassium, and the ammonium salt, per 100 parts by weight of the emulsion formed therewith, that the life of such emulsions is prolonged substantially beyond that which was known heretofore. Further, such compositions need not be enriched with time during continuous impregnation and/or coating operations therewith on textile fabrics to maintain a constant solids content therein and a constant percent solids pickup by the fabrics. Still further, the present compositions when used in the continuous coating and/or impregnation operations on textile fabrics will not build up on the machinery and in the tanks to form sticky and otherwise undesirable coatings, such as happens with many of the prior art compositions. These distinct advantages and others are obtained through the use of the improved emulsion compositions and process of the present invention.

Textile fabrics are coated and/or impregnated with the present emulsion systems such that upon subsequent cure, urethane polymers provide the fabric with a dry, solids pickup of about 0.5 to 50 percent by weight based upon the weight of the fabric. By "solids pickup" is meant, within the concept of the present invention, the weight percent of the cured urethane polymers and other non-water and non-solvent materials, e.g., pigments, residues of emulsifying agents, colloid stabilizers, curing catalysts, etc. in the polymer matrix and fabric.

The novel stable aqueous emulsion systems of the present invention are prepared by, first, providing a solution of at least one at-least-partially blocked, crucible urethane prepolymer and a curing agent therefor; and then emulsifying this prepolymer-curing agent solution in water through the agency of a water soluble salt of polyacrylic acid. Solutions of the at-least-partially blocked, curable, urethane prepolymer and curing agent therefor may be provided in several ways; e.g., where the prepolymer and curing agent are substantially miscible with one another, such a desired solution is provided merely upon mixing and which may, if wished, be diluted for purposes of easier handling with a mutually miscible or soluble inert organic solvent. Where the prepolymer and curing agent therefor are not substantially miscible they may also be dissolved in a mutually miscible or soluble inert organic solvent. These solutions once emulsified in water form oil-in-water emulsions. By oil is meant, within the concept of the present invention, the solution of the at-least-partially blocked urethane prepolymers and the curing agents therefor. As noted above, organic solvents which may be used in the practice of the present invention are inert organic compounds which may be water miscible or soluble or not. Water miscible or soluble solvents of this type would include water soluble ethyl ethers such as ethylene glycol monoethyl ether acetate (2-ethoxy acetate or Cellosolve acetate) and ethylene glycol monomethyl ether acetate (methyl Cellosolve acetate) as well as lower molecular weight ketones such as methyl ethyl ketone and acetone. Inert organic solvents not miscible with or soluble in water which may also be used according to the present invention include hydrocarbon and halocarbon materials such as benzene, xylene, toluene, methylene chloride, trichloroethylene and perchloroethylene. By inert it is meant that the solvent should not contain active hydrogen groups, as in the form of OH, SH, COOH or NH$_2$ groups.

For reasons of economy and ease of handling it is preferable to prepare oils which have as high a "solids content" as possible. By "solids content" is meant the weight percent of non-solvent and non-aqueous materials present in the liquid systems of this invention such as the total weight percent of the prepolymers, blocking agents, emulsifying agents, curing agents, colloid stabilizers, fillers, etc., as would be present in the emulsions, or in the case of the prepolymer solutions, the weight percent of the prepolymers, the blocking agents, and the curing agents which are present. The oils desirably may contain between about 25 and 100% solids. However, it is preferable for reasons of economies in transportation and packaging prior to the preparation of the present emulsions, to prepare oils which contain high precent solids within the range given. For similar reasons it is desirable that the emulsions be also initially prepared to have as high a solids content as is possible. However, the present novel emulsions may be prepared with solids content of as little as 0.5% or less and still be stable enough to be transported and stored for prolonged periods prior to use on fabrics. The low solids content emulsions of the present invention may be formed either directly from the oils, or from aqueous emulsions of the oils having higher solids content merely by dilution with water and mixing.

In preparing the present oils, the prepolymer, solvent, where it is used, and blocking agent are preferably added to a mixing chamber, in that order, and mixed together to effect at-least-partial blocking of the active isocyanate groups on the prepolymer. Since the reaction of the blocking agent with the prepolymer will usually cause an exothermic evolution of heat, and thus an increase in temperature, it is preferable to allow the at-least-partially blocked prepolymer composition provided to cool to about room temperature before admixing a curing agent therewith. The oils obtained thereby can be stored with or without adjuvants admixed therein such as the present emulsifying agents, colloid stabilizers, curing catalysts which accelerate the rate of cure of the prepolymer and the curing agent during the subsequent heat treatment of emulsions laid down on the fabrics, and/or pigments and other adjuvants, without later substantially interfering with the stability of the present emulsion systems. Adjuvants other than the present emulsifying agents may either be added concurrently with or subsequent to the aqueous emulsification of the oil.

In preparing the present novel emulsions, the present emulsifying agents, i.e., the water soluble salts of polyacrylic acid, may be added directly to the oil, or may be dissolved in water and added to the oil at that point. In the latter instance, the emulsifying agents may be dissolved in water to form aqueous solutions containing approximately 7 or more percent by weight of such agents. According to the practice here taught, where the percent of emulsifying agents in such aqueous solutions falls substantially below approximately 7% by weight of the aqueous solutions to be emulsified with the present oils, and prior to subsequent dilution with water to the ultimately desired low percent solids emulsions of this invention, only poorly stable emulsions are ultimately obtained. Thus it is seen, according to the practice of this invention, that the present emulsifying agents may either be added directly to the present oils, or may be added to the oils in the form of at least a 7% by weight aqueous solution and emulsified therewith to a high percent solids emulsion. Where the emulsifying agents are added directly to the oils, occasionally such mixtures may be excessively viscous; therefore, the preferred procedure is to add the emulsifying agents in the form of an aqueous solution thereto. The oils and the aqueous solutions of emulsifying agents are thoroughly mixed, as with a mechanical mixer and form stable aqueous urethane emulsions of this invention. This may be accomplished with a mechanical mixer usually within 5 to 10 minutes. The high solids content emulsion compositions of this invention may then be diluted with water and with stirring to form stable emulsions containing about 0.5% or more by weight of solids, and about 0.01 to 10% by weight of an emulsifying agent of this invention. Such low solids content emulsions formed either directly from the prepolymer solutions containing the emulsifying agents or a higher solids content emulsions prepared as described above may then be used to wet fabrics. It is to be noted that unlike emulsions of the prior art, such as those revealed by Borsellino and Samson, in S.N. 170,251, the present emulsions may be prepared without the need for special precautions; such precautions which have been obviated through practice of the present invention include the otherwise necessary slow addition of water to the prepolymer solutions until an inversion point in water-in-oil to oil-in-water emulsions is reached. Further, the present oil-in-water emulsions may be prepared by either adding water to the oil itself or to high concentration solids content oil-in-water emulsions, prepared as described above, or, on the other hand, by adding oils of this invention containing emulsifying agents, or high solids content oil-in-water emulsions of this invention to water to obtain highly dilute stable aqueous urethane emulsions of the present invention. Prior art emulsions invariably required in their preparation the addition of water slowly to high solids content emulsions or to prepolymer solutions containing emulsifying agents, and care in attaining an emulsion inversion point.

The urethane prepolymers which may be used in the present novel emulsions may be any known to those in art including ester, ether, acetal, thioester and/or thioether type backbones. The pertinent feature of such prepolymers is that they contain a plurality of reactive NCO groups. The ester type prepolymers are preferred. The most preferred of these ester prepolymers are prepared with polyols from castor oil, and also ethyleneglycol/propyleneglycol/adipic acid reaction products. The prepolymers are formed by so reacting the polyols and one or more polyisocyanate materials such as 2,4- and 2,6-toluene diisocyanate, diphenylmethane-4,4'-diisocyanate, 1,5-naphthalene diisocyanate, hexamethylene diisocyanate, para and meta phenylene diisocyanate, naphthalene triisocyanate and p.p'.p"-triphenyl methane triisocyanate, such that the resulting prepolymer produced has an active isocyanate content of about 1 to about 30% by weight.

Emulsions of the present invention require the use of at-least-partially blocked prepolymers. These prepolymers may be blocked with one or more of relatively low molecular weight, e.g., about 150 or less, blocking agents including ketoximes, such as methylethyl ketoxime, methyl methyl ketoxime, and cyclohexanone oxime; imines such as ethylenimine and propylenimine; and low molecular weight oximes. In general, the preferred at-least-partially blocked prepolymers are those prepared with ketoximes, because such blocked prepolymers have, in general, better cure temperature properties, for the present end uses, such as a quicker unblocking and cure at relatively low temperatures, e.g., at about 180° F. within short periods of time. The most preferred blocking agent for present use is methylethylketoxime. Imine blocked prepolymers may be used where the fabrics upon which they are deposited are capable of tolerating higher cure temperatures, e.g., about 250 to 350° F. In blocking the prepolymers, the prepolymer and blocking agent are reacted in a ratio of numbers of equivalents of isocyanate in the prepolymer to that of active hydrogen in the blocking agent, hereinafter referred to as [(—NCO)/(—OH)$_B$], of 1.0 to about 10. Gelling may occur if the blocking ratio is greater than about 2.8 in the more concentrated systems having solids contents of the order of about 70%. Thus it is to be seen that the present prepolymers are at-least-partially blocked to the extent of having at least 10% of the active isocyanate groups capped with the dissociable heat sensitive blocking agent. Although the prepolymer and the blocking agent may be reacted, and then put into an inert organic solvent such as is described herein, it is preferable to place the prepolymer into the inert organic solvent, and add the blocking agent thereto, to permit reaction therebetween. The inert organic solvent acts as a diluent to reduce the viscosity of the prepolymer, thus to make handling of the reaction system easier, and to avoid processing problems that might otherwise arise.

The organic solvents which may be used to prepare the urethane prepolymer solutions employed in the practice of the present invention should be inert to reaction with the prepolymer, as indicated above, and they should also be inert with respect to reacting with the blocking agent, the curing agent and the present emulsifying agents. Alcohols may not be used as organic solvents in the present systems because they will tend to react with the prepolymer. The useful solvents may be used alone or in combination with one another, and in quantities of about zero to 2000 parts by weight per 100 parts by weight of blocked prepolymer. It is to be noted that the blocked prepolymer and curing agents must be soluble in or miscible with the inert organic solvent chosen for any particular composition of this invention.

Curing agents for the present prepolymers are dissolved in the at-least-partially block prepolymer or its organic solvent solution subsequent to the at-least-partially blocking of such prepolymers. Where the $$[(-NCO)/(-OH)_B]$$

is above 1.0 at least some isocyanate remains reactive after the blocking reaction. Addition of the curing agent at this point as is required by the present invention will cause reaction between the curing agent and such remaining reactive isocyanate. This partial cure does not cause any undesirable effects upon the subsequent use of emulsions of this invention prepared therewith in the treatment of fabrics. The curing agent is used in such quantities as to insure that there is available in the emulsion systems of this invention for cure reactions with the active isocyanate content as was in the prepolymer prior to blocking an active hydrogen content as provided by the curing agent sufficient to provide a ratio in equivalents of $$[(-NCO)/(-OH)_C]$$

of about 0.3 to 3.0. The active hydrogen may be in the form of OH, $NH_2$, COOH or SH. For enhanced emulsion stability purposes it is preferable to use hydroxyl containing curing agents as the source of the active hydrogen. Curing agents which may desirably be used for this purpose include N,N,N',N'-tetrakis(2-hydroxypropyl) ethylene diamine, triisopropanolamine, and triethanolamine. Other active hydrogen containing cure agents which may be used include methylenebis(orthochloroaniline), diethylene triamine, ethylene diamine, propylene diamine, hexamethylene diamine, triethylene tetramine, N,N' diisobutyl hexamethylene diamine and tetraethylene pentamine. The curing agents may be used alone or in combination with one another. N,N,N',N'-tetrakis(2-hydroxypropyl) ethylenediamine and triethanolamine are the preferred curing agents for present use because they tend to impart faster cures and even better stability properties to the present emulsion systems. The temperatures needed to cause unblocking of the prepolymer according to the present invention are in the order of about 180 to 300° F.; therefore, most of the water that is present in the emulsion systems will be evaporated from treated fabric before the unblocking reaction occurs. Thus it is seen that only a relatively small amount of water will be present during the curing reaction between the unblocked prepolymer and the curing agent. Water also contains reactive hydrogen in the form of hydroxyl and some small portion of water which remains after unblocking of the prepolymer may react with some of the active isocyanate groups that are present; however, it has been found that these amounts of water reacted under such conditions will not cause any deleterious effects upon the properties of the cured system.

Tap water may be used as the source of water for forming the emulsions of the present invention. It has been found that it is no longer needed to use distilled or deionized water to prepare the present emulsions such as had been needed to prepare those compositions previously disclosed by others.

Where it is desired to speed the cure of the prepolymer by the curing agent, about 0.1 to 0.5 part by weight of one or more curing catalysts per 100 parts by weight of the emulsion system may be used. Such catalysts are not curing agents themselves. They are, in general, metallic containing or alkaline, such as amino, organic compounds, the nature of which has been extensively discussed by J. W. Britain in Ind. & Eng. Chem. Product Research and Development, 1, 261 (December 1962). Among the more valuable catalysts lead octoate, lead acetonate, triethyl amine, zinc-2-ethylhexoate, lead benzoate, lead oleate, and stannous octoate may be used for this purpose. Without the catalysts present the unblocked prepolymers will cure, according to the process of the present invention, in about 10 to 30 minutes and 180 to 300° F. With the catalysts present, particularly lead octoate, the prepolymers will cure in about 2 to 15 minutes at 180 to 300° F. An especially fast cure in about 10 seconds may be obtained at temperatures of about 400 to 425° F. Inclusion of the catalysts in the present emulsion systems does not interfere with the long term stability of the emulsions.

One or more pigments, such as titanium dioxide, carbon black, iron oxide, and silica may also be incorporated into the present emulsion systems to impart improved or varied color properties to the fabrics treated therewith.

The improved textile fabric treating compositions of the present invention may be used to treat fabrics in various forms, such as denims, gabardines, khakis, industrial garb, non-woven fabrics, drills, twills, jeans, tickings, tapes, and bindings. For the treatment of non-woven fabrics in particular, the art has long sought such compositions as those of the present invention wherewith improved abrasion resistance, softness of hand, and enhanced crease resistance may be readily and safely imparted to fabrics without substantially stiffening the fabrics.

The following examples depict illustrative embodiments of the practice of the present invention, but do not seek to impose limitations upon its scope as defined in the appended claims.

PREPARATION OF PREPOLYMER-1

Ethylene glycol, 297.6 g. (4.8 moles), and 91.2 g. (1.2 moles) of propylene glycol were charged to a glass reaction vessel fitted with an agitator, a thermometer, a nitrogen inlet tube, a steam jacketed condenser, and a cold water condenser. There was then added 800 g. of adipic acid (5.5 moles), to provide a stoichiometric insufficiency of acidic groups, and thus to insure that the resultant copolyester molecules were hydroxyl-terminated.

The reaction mixture was heated to about 160° C., and esterification proceeded with nitrogen purging and stirring. Water produced by the esterification reaction was refluxed until the temperature of the reaction system fell to 130° C. in about 2 hours. The water, about 97% of theoretical, was then removed by distillation from the reaction vessel. The reaction temperature was then allowed to rise to 200° C. Heating was continued until the pot products showed an acid number of less than 3. The reaction was then stopped by cooling the pot to ambient temperatures.

The copolyester glycol produced above, 361.13 g. (0.25 equivalent weight), was charged to a glass reactor fitted with an agitator, a thermometer, a feed funnel and a cold water reflux condenser which was open to the atmosphere through a drying tube. The pot temperature was raised to 50° C., and 47.0 g. (0.54 eq. wt.) of an 80/20 isomer mixture of 2,4/2,6 toluene diisocyanate was added within a 10-minute interval. The reaction proceeded under a blanket of nitrogen at 80° C. for four hours. The difunctional isocyanate-terminated product, Prepolymer-1, had about 3% by weight of reactive isocyanate, and an equivalent weight of approximately 1400.

Examples 1 to 8

Emulsions of the present invention were prepared in Examples 1 to 7 using Prepolymer-1, prepared as above.

In general, Prepolymer-1 was dissolved in an organic solvent, as listed in the table of examples below, to which sufficient quantities of the blocking agent methylethylketoxime were added and mixed therewith to form a ratio of equivalents of isocyanate to equivalents of active hydrogen in the blocking agent of 1.8. The organic solvent solution of at-least-partially blocked Prepolymer-1 was then mixed with sufficient quantities of a curing agent therefor to provide a ratio of equivalents of isocyanate in the prepolymer, as present prior to blocking, to equivalents of active hydrogen in the curing agent of about 1.15.

mixer; to this was added a 15% aqueous solution of sodium polyacrylate and mechanically stirred for a short interval until the desired emulsions of this invention were formed.

In each of the foregoing procedures, emulsions of the present invention were formed which had enhanced stability, which is to say a profound resistance to separation of the emulsion into organic and aqueous phases, for prolonged periods of time extending into months. Each of the foregoing methods produced emulsions which are capable of being diluted to at least 0.5% solids, and form stable emulsions of this invention upon mixing.

A further noteworthy aspect is that emulsions of this invention formed in any of the foregoing ways may be used in mixture with, among others, formaldehyde-urea type fabric treatment compositions, stored therewith, etc., and yet unlike prior art urethane emulsions, retain long-lived stability, and need not be enriched during continuous fabric treatment operations. Among other compatible fabric treatment compositions that may be used with the present emulsions are those based upon cyclic urea, carbamate, silicone, acrylic and fluorocarbon resins.

|  | Example | | | | | | | |
|---|---|---|---|---|---|---|---|---|
|  | 1 | 2 | 3 | 4 | 5 | 6 | 7 | 8 |
| Method used to prepare emulsion [1] | A | C | C | A | B | A | D |  |
| Recipe, in parts by weight: | | | | | | | | |
| Prepolymer-1, 3.22% in isocyanate, in emulsion | 32.5 | 32.5 | 32.5 | 32.5 | 4.65 | 4.55 | 32.5 | 32.5 |
| 2-ethoxyethylacetate (Cellosolve acetate), in emulsion | 14.65 | 14.65 | 14.65 | 14.65 | 2.09 | 2.05 | 14.65 | 14.65 |
| Methylethylketoxime, in emulsion | 1.2 | 1.2 | 1.2 | 1.2 | 0.17 | 0.17 | 1.2 | 1.2 |
| N,N,N',N'-tetrakis (2-hydroxypropyl) ethylene diamine, in emulsion | 1.6 | 1.6 | 1.6 | 1.6 | 0.23 | 0.224 | 1.6 | 1.6 |
| 1/9 w./w. sorbitan monolaurate/polyoxyethylene sorbitan monolaurate, in emulsion | 0.5 | 0.5 | 0.5 |  |  |  |  | 0.5 |
| 15% sodium polyacrylate aqueous solution used | 24.75 | 16.5 | 12.375 | 25 | 3.75 | 46.5 | 25 |  |
| Water to dilute 15% solution | 24.75 | 33 | 37.125 | 25 | 3.75 | 46.5 | 25 |  |
| Ratio 15% sol'n/water of dilution | 1 | 0.5 | 0.33 | 1 | 1 | 1 | 1 |  |
| Water added later | 0 | 0 | 0 | 0 | 90 | 0 | 0 | 50 |
| Total water in emulsion | 45.79 | 47.0 | 47.64 | 47.79 | 96.85 | 86.0 | 45.79 | 50 |
| Sodium polyacrylate in emulsion | 3.71 | 2.48 | 1.86 | 3.71 | 0.53 | 6.98 | 3.71 |  |
| Lead octoate in emulsion | 0.35 | 0.35 | 0.35 | 0.35 | 0.05 | 0.35 | 0.35 | 0.35 |
| Percent sodium polyacrylate in emulsion | 3.7 | 2.5 | 1.9 | 3.7 | 0.5 | 6.97 | 3.7 | 0.0 |
| Percent solids in emulsion | 39.9 | 38.8 | 38.2 | 39.56 | 5.3 | 12.2 | 39.56 | 35 |
| Stability of emulsion, in days | >60 | <2 | <1 | >60 | >60 | >60 | >60 | 2 |
| Coating on metal [2] | W | W | W | W | W | W | W | NW |
| Appearance of emulsion upon preparation [3] | U, T | U, T | U, T | U, T | U | NU, T | U, T | U, T |

[1] Methods A, B, C, and D as in text.
[2] W=easily washable with water; NW=not easily washable, sticky coating.
[3] U=uniform; T=thick; NU=not uniform.

The at-least-partially blocked prepolymer/curing agent solution or oil of this invention that was thus formed was then admixed in the following ways with the emulsifying agent sodium polyacrylate, the sodium salt of polyacrylic acid:

(A) A fifteen percent solids solution, which is to say 15% by weight solution, of sodium polyacrylate in water was diluted 1 to 1 with water to provide a solution approximately 7.5% by weight of sodium polyacrylate in water; this aqueous solution was mixed with a mechanical mixer with the above oil of this invention to provide a relatively high solids content emulsion of this invention.

(B) A 7.5% by weight aqueous solution of sodium polyacrylate was admixed using a mechanical mixer with the oil, an at-least-partially blocked Prepolymer-1/curing agent organic solvent solution, prepared above. To the relatively high solids content emulsion of this invention there was then added water in sufficient quantities to achieve a finally desired percent solids, and the components were admixed mechanically to form a low solids content emulsion of this invention.

(C) A 15% by weight aqueous solution of sodium polyacrylate was admixed with an amount of water to give a desired end percent solids in the final emulsion; this solution of emulsifying agent was then mixed with the oil, an organic solution of the at-least-partially blocked Prepolymer-1/curing agent, by using a mechanical mixer to form emulsions of this invention.

(D) The oil, an at-least-partially blocked Prepolymer-1/curing agent organic solvent solution, was admixed with enough water to provide a final desired percent solids in the desired emulsions of this invention with a mechanical In Examples 1 to 3, 0.5 part by weight of a mixture of prior art emulsifying agents was added to the recipe; however, no substantial improvement in emulsion stability over use of sodium polyacrylate alone, viz, Examples 4 to 7, was obtained. In Examples 2 and 3 it is demonstrated that where the sodium polyacrylate aqueous solution mixed with the oil has substantially less than about 7.5% emulsifying agent present, only poorly stable emulsions are obtained, not exceeding about 2 days at ambient temperatures. Such poorly stable emulsions are comparable to those obtained with prior art emulsifying agents when used by themselves. However, when the aqueous solutions of sodium polyacrylate initially admixed with the oil has 7.5% or more sodium polyacrylate present, they may be emulsified with the oil and other components including additional water to form stable emulsions of this invention. Example 5 demonstrates that when the foregoing requirement is adhered to the emulsions provided may contain 0.5% emulsifying agent and be stable. In Example 5, an emulsion of the type provided in Example 4 was prepared, and to 15 parts by weight of this 90 parts of weight of water were added to provide upon stirring the stable emulsion of only about 5% solids content. In Example 6, 7 parts by weight of the oil was emulsified with 93 parts by weight of a 7.5% by weight sodium polyacrylate solution to give a stable, albeit not uniform emulsion. This emulsion, however, may be further diluted with water and provide a stable uniform emulsion, upon mixing of low solids content. In Example 7, the 15% aqueous solution of sodium polyacrylate, water, and the oil were emulsified at one time to provide a uniform stable emulsion of this invention. This emulsion too may be further diluted to provide upon mixing a stable uniform emulsion of low solids content. Example 8 shows an emulsion of the prior art.

Examples 9 to 12

In similar manner to Examples 1 to 7, stable emulsions of this invention were prepared using 22% and 11% aqueous solutions of ammonium polyacrylate in place of the 15% and 7.5% solutions of sodium polyacrylate used above.

|  | Example | | | |
|---|---|---|---|---|
|  | 9 | 10 | 11 | 12 |
| Method used to prepare emulsion[1] | A | A | B | A |
| Recipe, in parts by weight: | | | | |
| Prepolymer-1 | 32.5 | 32.5 | 4.65 | 4.55 |
| 2-ethoxyethyl acetate | 14.65 | 14.65 | 2.09 | 2.05 |
| Methylethylketoxime | 1.2 | 1.2 | 0.17 | 0.17 |
| N,N,N',N'-tetrakis(2-hydroxypropyl)ethylene diamine | 1.6 | 1.6 | 0.23 | 0.224 |
| 1/9 w./w. sorbitan monolaurate/polyoxy-ethylene sorbitan monolaurate | 0.5 | | | |
| 22% ammonium polyacrylate aqueous solution used | 24.75 | 25 | 3.75 | 46.5 |
| Water to dilute 22% solution | 24.75 | 25 | 3.75 | 46.5 |
| Ratio 22% sol'n/water of dilution | 1 | 1 | 1 | 1 |
| Water added later | 0.0 | 0.0 | 90 | 0.0 |
| Total water in emulsion | 44.06 | 44.5 | 96.35 | 82.73 |
| Ammonium polyacrylate | 5.445 | 5.5 | 0.785 | 10.23 |
| Lead octoate | 0.35 | 0.35 | 0.05 | 0.35 |
| Percent ammonium polyacrylate in emulsion | 5.45 | 5.5 | 0.748 | 10.2 |
| Stability of emulsion, in days | 60 | 60 | 60 | 60 |
| Coating on metal[2] | W | W | W | W |
| Appearance of emulsion upon preparation[3] | U, T | U, T | U | NU, T |

(1), (2), (3) as in table for Examples 1 to 8.

Example 13

In similar manner to Example 10, an emulsion of this invention was prepared using an oil of the recipe.

Ingredient: Parts by weight
Prepolymer-1 _____ 100
Methylethylketone _____ 45
Methylethylketoxime _____ 3.1
N,N,N',N'-tetrakis(2-hydroxypropyl)ethylene
diamine _____ 5.8 which had a ratio in equivalents of [—NCO/—OH$_B$] of 2.25, and a ratio in equivalents of [—NCO/—OH$_C$] of 1.0. Fifty parts by weight of this oil were admixed with 0.35 pbw. of lead octoate, and 50 pbw. of an 11% solids aqueous solution of ammonium polyacrylate to provide upon agitation a thick, uniform emulsion, stable for at least 60 days at ambient temperatures, and easily washable from metal with water. This emulsion was capable of dilution to about 0.5% solids content with water to provide upon agitation a uniform stable emulsion of this invention useful in fabric treatment.

Example 14

In similar manner to Example 4, identical emulsions of this invention were prepared, in the first instance by adding the oil to the 7.5% solids aqueous solution of sodium polyacrylate, and in the second instance by adding the 7.5% solids aqueous solution to the oil, with agitation. No inversion point of oil-in-water to water-in-oil, or water-in-oil to oil-in-water was observed.

Example 15

In similar manner to Example 4, an emulsion of this invention useful for fabric treatment was prepared using an oil of the recipe Ingredient: Parts by weight
Prepolymer-1 _____ 100
2-ethoxyacetate _____ 45
Methylethylketoxime _____ 5.8
N,N,N',N'-tetrakis(2-hydroxypropyl)ethylene
diamine _____ 4.9 which had a ratio in equivalents of [NCO/—OH$_B$] of 1.0, and a ratio in equivalents of [—NCO/—OH$_C$] of 1.15. Fifty parts by weight of this oil were admixed with 50 pbw. of a 7.5% solids aqueous solution of sodium polyacrylate with agitation to provide a stable, uniform, thick emulsion of this invention with a life of at least 60 days.

Example 16

A 5% solids stable and uniform emulsion of this invention useful for fabric treatment was prepared by agitative admixture of 15 parts by weight of the emulsion prepared in Example 15 with 90 pbw. of tap water.

Preshrunk cotton fabric, from which starch and sizing had been removed, was treated with the 5% solids emulsion, prepared as above, by dipping the fabric into the emulsion for 3 seconds. The wetted fabric was blotted with absorbent paper to remove excess emulsion, and heated at 250° F. for 10 minutes to remove water, solvent and blocking compound, and to cure the prepolymer. The dry treated fabric showed a solids pickup of about 6.6% by weight, and was soft with good handle and drape.

Examples 17 to 20

Emulsions of this invention were prepared according to the recipe of Example 4 employing methods A, B, C, and D. The emulsions were laid down on cotton and nylon tricot fabrics in an alternating dot pattern. The dot wetted surfaces of the fabrics were joined and pressed together by hand pressure. The cotton-emulsion interface-nylon tricot joined fabrics were heated for 10 minutes at 250° F. to provide breatheable soft fabric laminates of good handle.

The laminates were then subjected to the standard ASTM bond peel strength test for fabrics at a jaw speed of 12 inches/min.

|  | Example | | | |
|---|---|---|---|---|
|  | 17 | 18 | 19 | 20 |
| Method of emulsion preparation | D | B | C | A |
| Viscosity of emulsion, poises | 122 | 113 | 120 | 125 |
| Bond peel strength, oz | 27.5 | 30.0 | 27.0 | 32.8 |

Example 21

Prepolymer-2 was prepared by reaction of about 1 mol of a 2000 molecular weight polypropylene ether glycol and about 2 mols of 80/20 isomeric mixture of 2,4/2,6-toluene diisocyanate, according to the procedure for the preparation of Prepolymer-1, which had an isocyanate content of about 3.5% by weight. Prepolymer-2 was reacted with methylethylketoxime in 2-ethoxyethylacetate according to the procedure of Example 4 to provide a fully blocked prepolymer with a ratio of equivalents of isocyanate to equivalents of active hydrogen

[—NCO/OH$_B$]

of 1.0. The blocked prepolymer solution was admixed with sufficient N,N,N',N'-tetrakis(2-hydroxypropyl)ethylene diamine to provide a ratio of equivalents of isocyanate present in the prepolymer prior to blocking to equivalents of hydroxyl in the curing agent, [—NCO/OH$_C$], of 1.15. Preparation of a stable aqueous emulsion of this invention with a solids content of about 40%, and a percent sodium polyacrylate of about 4% by weight and suitable for fabric treatment, and further dilution, was pursued according to method A as described in Examples 1 to 8.

Example 22

A castor oil based, prepolymer, Prepolymer-2, was prepared from castor oil and an 80/20 mixture of 2,4/2,6-toluene diisocyanate. The prepolymer had an NCO content of 10.5 to 10.7. Prepolymer-2 was dissolved in methylene chloride and reacted with methyl ethyl ketoxime so as to provide a ratio, [—NCO/OH$_B$], of 1.15. The system was then cooled to room temperature and sufficient N,N,N',N'-tetrakis(2 - hydroxypropyl)ethylene diamine was added to the solution to provide a ratio,

[—NCO/OH$_C$]

of 1.15. The solution had a solids content of about 70% by weight. 0.35% by weight of lead octoate was then added to the solution. An 11.2% by weight solution of sodium polyacrylate in water was then added to the solution so as to provide 5.6% by weight of the emulsifier in the resulting system which system was then mechanically mixed to provide a creamy emulsion. The emulsion had a viscosity (measured at room temperature with Brookfield RVF Viscometer) initially of 987.5 poise which only changed to 940.0 poise in a month. At the end of the month the emulsion was stable and thin coatings of the emulsion were then placed on aluminum panels and cotton/polyester blend fabric patches and the coatings were cured thereon for 5 minutes at 250° F. to provide adherent abrasion resistant coatings.

Example 23

A polyether based prepolymer, Prepolymer-3, was prepared from polyalkylene ether glycol having a molecular weight of about 4000 and an 80/20 mixture of 2,4/2,6-toluene diisocyanate. The prepolymer had an NCO content of 3.8 to 4.0%. Prepolymer-3 was then dissolved in xylene and reacted with methyl ethyl ketoxime so as to provide a ratio, [—NCO/OH$_B$], of 1.0. The system was then cooled to room temperature and sufficient N,N,N',N' - tetrakis(2 - hydroxypropyl)ethylene diamine was added to the solution to provide a ratio, [—NCO/OH$_C$], of 1.15. The solution had a solids content of about 70% by weight. 0.35% by weight of lead octoate was then added to the solution. An 11.2% by weight solution of sodium polyacrylate in water was then added to the solution so as to provide 5.6% by weight of the emulsifier in the resulting system which system was then mechanically mixed to provide a creamy emulsion. The emulsion had an initial viscosity of 440.0 centipoises which changed to 2580.0 centipoises in a month. The emulsion exhibited slight separation at the end of the month which could readily be corrected by remixing, and thin coatings of the emulsion were then placed on aluminum panels and cotton/polyester blend fabric patches, and the coatings were cured thereon for 5 minutes at 250° F. to provide adherent abrasion resistant coatings.

We claim:

1. A process for preparing a stable aqueous urethane emulsion for fabric treatment which may be diluted with water up to at least 99.5% and used without enrichment during continuous impregnation and/or coating of fabrics, said process comprising
    (a) admixing to form an oil
        (1) an at-least-partially blocked polyurethane prepolymer present in at least 25% by weight quantity of said oil having a ratio in equivalents of reactive isocyanate in about 1 to 30% by weight of the prepolymer prior to blocking to equivalents of active hydrogen groups from the blocking agent of 1 to about 10,
        (2) a curing agent for said prepolymer present in the oil in such quantity as to provide a ratio of equivalents of reactive isocyanate as present in said prepolymer prior to blocking to equivalents of active hydrogen groups present in said curing agent of 0.3 to 3.0, and
        (3) an inert organic solvent present in said oil in from about 0 to 75% by weight;
    (b) admixing with said oil to form an admixture, emulsifying agent consisting essentially of a water soluble salt of polyacrylic acid composition comprising at least 7% by weight of said composition a water soluble salt of polyacrylic acid and water in from 0 to 93% of said composition; and
    (c) admixing with said admixture formed in step (b) above, water to form a stable aqueous urethane emulsion for fabric treatment, said water being present in said emulsion in from about 5 to 99.5% by weight, and said salt being present in about 0.01 to about 10% by weight of said emulsion.

2. A process according to claim 1 wherein said water soluble salt of polyacrylic acid is sodium polyacrylate.

3. A process according to claim 1 wherein said water soluble salt of polyacrylic acid is ammonium polyacrylate.

4. A process according to claim 1 wherein said prepolymer is formed from the reaction of a diisocyanate and a polyester glycol.

5. A process according to claim 1 wherein said prepolymer is formed from the reaction of a diisocyanate and a polyether glycol.

6. A stable aqueous urethane emulsion for fabric treatment made according to the process of claim 1.

7. A stable aqueous urethane emulsion for fabric treatment made according to the process of claim 1 wherein said water soluble salt of polyacrylic acid is sodium polyacrylate.

8. A stable aqueous urethane emulsion for fabric treatment made according to the process of claim 1 wherein said water soluble salt of polyacrylic acid is ammonium polyacrylate.

9. A stable aqueous urethane emulsion for fabric treatment made according to the process of claim 1 wherein said prepolymer is formed from the reaction of a diisocyanate and a polyester glycol.

10. A stable aqueous urethane emulsion for fabric treatment made according to the process of claim 1 wherein said prepolymer is formed from the reaction of a diisocyanate and a polyether glycol.

11. A stable aqueous urethane emulsion for fabric treatment made according to the process of claim 1 wherein said at-least-partially blocked polyurethane prepolymer is formed from the reaction of the polyisocyanate toluene diisocyanate and the active-hydrogen-groups containing polyester that is a copolyester glycol of ethyleneglycol/propyleneglycol/adipic acid.

12. A stable aqueous urethane emulsion for fabric treatment made according to the process of claim 1 wherein said curing agent for said prepolymer present in said oil has hydroxyl active hydrogen groups.

13. A stable aqueous urethane emulsion for fabric treatment made according to the process of claim 1 wherein said curing agent is N,N,N',N'-tetrakis(2-hydroxypropyl)ethylene diamine.

14. A stable aqueous urethane emulsion for fabric treatment made according to the process of claim 1 wherein said blocking agent is selected from the group of blocking agents consisting of ketoximes, oximes, and imines with a molecular weight of at most 150.

15. A stable aqueous urethane emulsion for fabric treatment made according to the process of claim 14 wherein said blocking agent is a ketoxime.

16. A stable aqueous urethane emulsion for fabric treatment according to the process of claim 15 wherein said ketoxime is methyl ethyl ketoxime.

References Cited

UNITED STATES PATENTS

| | | | |
|---|---|---|---|
| 2,875,166 | 2/1959 | Hopkins | 260—859 |
| 3,248,259 | 4/1966 | Borsellino et al. | 260—29.2 |
| 3,300,431 | 1/1967 | Ueno et al. | 260—29.6 |

MURRAY TILLMAN, Primary Examiner

H. ROBERTS, Assistant Examiner

U.S. Cl. X.R.

106—287; 117—139.4, 139.5, 138.8; 252—8.6; 260—29.2, 859